July 7, 1970   J. W. EHLEN   3,519,039
CHAIN SAW CUTTER LINK
Filed Jan. 31, 1968   2 Sheets-Sheet 2

INVENTOR
JACK W. EHLEN

BY Burns, Doane, Benedict,
Swecker & Mathis
ATTORNEYS

July 7, 1970 — J. W. EHLEN — 3,519,039

CHAIN SAW CUTTER LINK

Filed Jan. 31, 1968 — 2 Sheets-Sheet 1

INVENTOR
JACK W. EHLEN

BY Burns, Doane, Benedict, Swecker & Mathis
ATTORNEYS

United States Patent Office 3,519,039
Patented July 7, 1970

3,519,039
CHAIN SAW CUTTER LINK
Jack W. Ehlen, Torrance, Calif., assignor to McCulloch Corporation, Los Angeles, Calif., a corporation of Wisconsin
Filed Jan. 31, 1968, Ser. No. 701,900
Int. Cl. B27b 33/14
U.S. Cl. 143—135            12 Claims

ABSTRACT OF THE DISCLOSURE

A cutter link including a substantially planar base plate having parallel flat sides. A carbide cutting tip, brazed or otherwise secured to the base plate, provides a concave cutting surface and a stabilizing recess which engages stabilizing shoulder means extending coextensively with the base plate. The shoulder means, stabilizing recess, and concave cutting surface are longitudinally aligned in the cutting travel direction of the cutter link. A rounded carbide edge extending longitudinally of the cutter link and merging with kerf-side and kerf-base-cutting surface means is provided so as to achieve optimum smoothness in cutting. A second stabilizing recess, formed in the cutting tip, faces transversely of the cutting travel direction and away from the kerf-base facing edge of the cutter link and embraces opposite sides of the cutter link.

---

This invention relates to an improved cutter link for use in a chain saw. Specifically, the invention is directed to a cutter link including a carbide cutting tip.

BACKGROUND AND OBJECTS OF THE INVENTION

In an effort to produce a chain saw which is less vulnerable to wear, several practitioners in the chain saw art have provided cutter links with carbide tip portions. One such endeavor is disclosed in a United States Mall Pat. 2,862,533. Mall discloses a carbide cutting tip having a U-shaped cross section which fits on the crest of the rear portion of a cutter link. An essentially similar carbide tip concept is disclosed in a Mills Pat. 2,976,900. Both the Mall and Mills tips lack cutter blade backup in the cutting travel direction. Further, the planar cutting surfaces of the Mall and Mills carbide tips, which presumably were maintained because of the brittle character of the carbide material, obviously do not yield the cutting advantages of concave cutting surfaces incorporated in conventional unitary, steel-cutting links.

A step forward in the art was provided by a cutter link concept disclosed in the United States Bullard Pat. 3,292,675. This patent discloses a carbide cutting link tip, backed up by a less brittle and inherently tougher steel extension of a cutter link base plate. Nevertheless, in the Bullard structure, it is necessary to bend the base plate so as to provide back-up support for an L-shaped carbide tip. Further, Bullard, in following the teaching of Mall and Mills, maintains a planar carbide cutting surface and does not attempt to utilize the more advantageous concave cutting surface concept. Further, carbide tips such as proposed by Mills and Mall maintain generally flat planar surfaces which inherently tend to produce an undesirable stringy cutting action.

In retrospect, it is clear that prior art efforts such as those above noted, consistently lead those practicing the chain saw art away from the concept of carbide cutting tips effectively integrating concave carbide cutting surfaces with effective, carbide tip back-up or support.

More recent efforts in the art of mounting carbide cutting tips on the links of cutter chains are exemplified by a United States Stihl et al. Pat. No. 3,360,022. Stihl et al. discloses an arrangement where a slot is formed in the base plate of a cutter link and an insert telescopingly inserted into this slot. Obviously this arrangement requires a fairly high degree of precision manufacture. Further, with this slot concept, the base plate portion defining the leading edge of the slot will inherently offset the extent to which cutting forces will coact with the rear edge of the slot to produce carbide tip, compression inducing, forces. An additional example of complexity involved in the mounting of a cutting tip is to be found in a French Pat. No. 1,102,721 issued to the Stone Patent Corporation. This patent proposes a mounting for a carbide tip comprising a ledge defined by two obtusely inclined surfaces. The structure defining the ledge is in turn secured by a pin type fastening to a cutter link body. Significantly, this mounting concept deliberately rejects stabilization of the carbide tip and instead, teaches stabilization of the mount for the tip.

It is equally apparent that the prior art efforts notwithstanding, there remains a need for improved concepts in stabilizing the relatively minute and brittle carbide tips if they are to be associated with cutting links on an effective commercial basis.

Thus, it is a principal object of the present invention to provide a cutter link for a chain saw which is effectively mounted and stabilized so as to enable the utilization of a concave cutting surface.

It is likewise a principal object of the invention to provide a cutter link for a chain saw which maintains a structurally simple, planar base plate and yet which effectively backs up and supports a carbide tip in the direction of cutting travel of the link.

It is also an object of the invention to provide a uniquely effective, yet structurally simple, mechanism for stabilizing a carbide cutting tip on a planar base plate of a cutter link of a chain saw which mechanism effectively eliminates stringy kerf-cutting action.

It is yet another object of the invention to provide compound multi-directionally effective, stabilizing action for mounting a carbide tip on a cutter link base plate.

SUMMARY OF THE INVENTION

In relation to a preferred embodiment, the cutter link of the present invention comprises a substantially planar base plate having generally parallel, flat sides. Aperture means formed in the base plate serve to connect the base plate to adjacent links in a chain saw. A shoulder means, substantially coextensive with the base plate, faces in the direction of cutting travel of the base plate. This shoulder means defines a substantially flat, planar continuation of the base plate. A concave, carbide cutting surface means extends transversely of the base plate and projects laterally beyond each side thereof. The portions of the concave surface means which project beyond each side of the base plate are contiguous with the base plate.

The concave, carbide cutting surface means is located forwardly of the shoulder means in the direction of the cutting travel, with a portion of the concave cutting surface means being aligned with the shoulder means in this direction. A kerf-base-cutting, carbide surface means extends transversely of the base plate. A kerf-side-cutting, carbide surface means extends generally longitudinally of the base plate and extends both forwardly and rearwardly of the shoulder means in the direction of cutting travel. The concave, carbide cutting surface means and the kerf-base and kerf-side-cutting, carbide surface means intersect laterally outwardly of one side of the base plate to define a concave, chisel-like corner facing generally in the cutting travel direction.

First stabilizing, carbide surface means connected with the concave carbide cutting surface means extends generally longitudinally of the base plate along one side of the shoulder means. Second stabilizing, carbide surface means connected with the concave carbide cutting surface means extends longitudinally of the base plate along a side of the shoulder opposite to the aforesaid one side. A carbide abutment means, extending transversely of and interconnecting the first and second carbide stabilizing surface means, faces the shoulder means and is interposed between the shoulder means and cutting surface means in the aforesaid travel direction.

Individually significant facets of the invention reside in the provision of a carbide stabilizing recess and a concave, carbide cutting surface in a carbide tip adapted to be mounted on a planar base plate of a cutting link and backed up, in the direction of cutting travel of the link, by a shoulder defining a planar base plate extension.

Other individually significant facets of the invention reside in a stabilizing recess characterized by wedge-like or diverging side faces, in a cylindrically configured, carbide cutting surface which provides a contiguous lateral projection on each of the opposite sides of the base plate of a cutter link, and in an arcuate edge which joins kerf-side and kerf-base cutting surfaces.

A uniquely valuable facet of the invention resides in the provision of both longitudinally and transversely facing, U-shaped stabilizing portions in the carbide tip. One such portion, which extends generally longitudinally of the cutting travel direction of the cutter link, embraces a carbide tip, back-up shoulder. The other U-shaped stabilizing portion, which faces away from the kerf-base facing edge of the cutter link, embraces a carbide tip supporting ledge extending generally longitudinally of the cutting direction.

Also noteworthy is a disposition of the axis of cylindrical curvature of a concave carbide cutting surface so as to be substantially aligned with a carbide tip supporting ledge extending in the direction of the cutting travel of the cutter link.

THE DRAWINGS

In disclosing the invention, reference will be made to a preferred embodiment shown in the appended drawings.

In the drawings.

OVERALL CHAIN STRUCTURE

Figure 1:
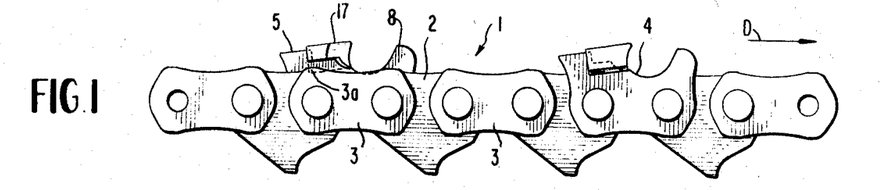
FIG. 1 provides a side elevational view of a portion of the cutter chain of a chain saw illustrating the manner in which carbide tipped cutter links of the present invention are mounted.
Figures 2, 3, 4, 5, 6, 7, 8:
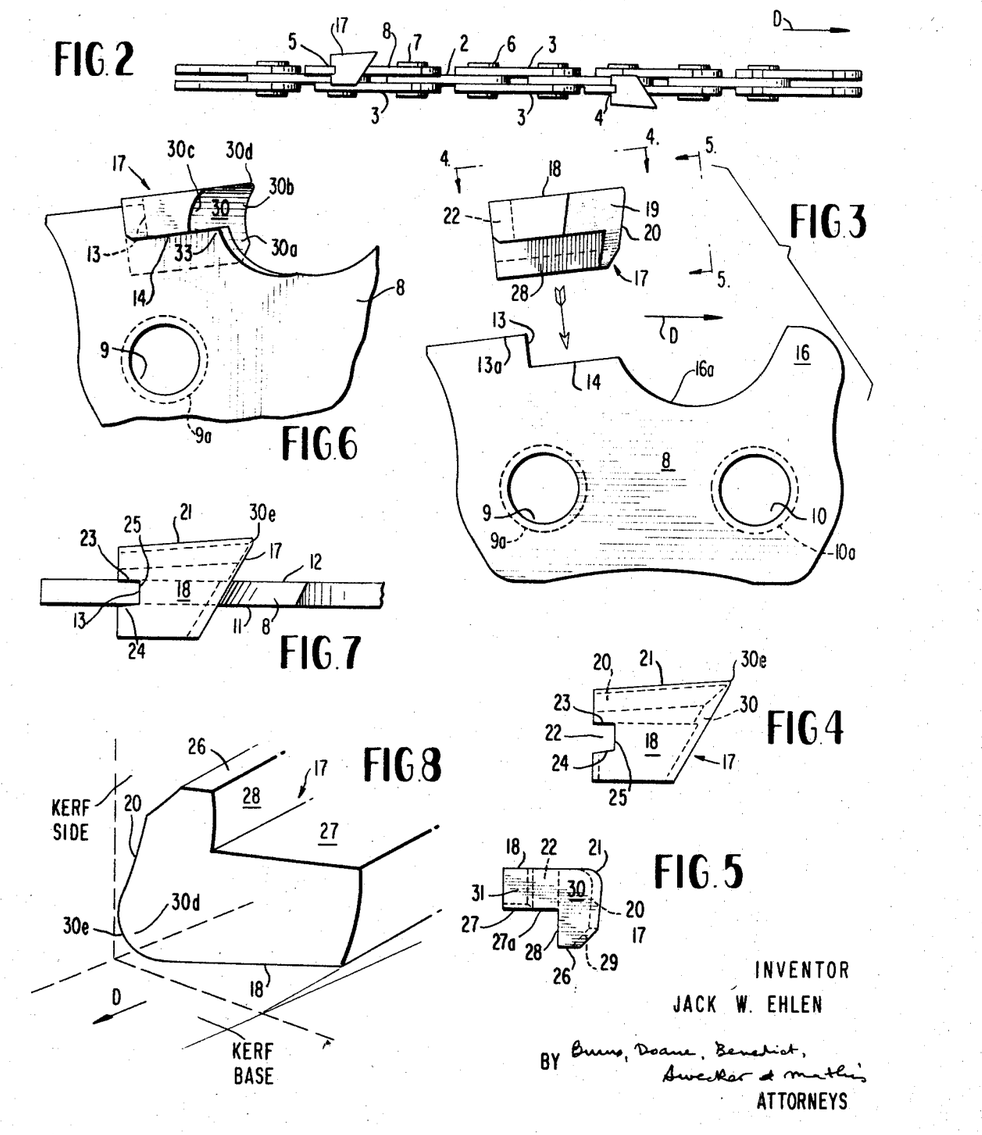
FIG. 2 provides a top plan view of the FIG. 1 link assembly.
FIG. 3 illustrates, in side elevation, a cutter link and base plate prior to their assembly and grinding.
FIG. 4 provides a top plan view of the carbide tip included in the FIG. 3 illustration.
FIG. 5 provides a front elevational view of the FIG. 3 carbide tip.
FIG. 6 illustrates the assembled carbide tip and planar base plate of FIG. 3 subsequent to the grinding of these assembled components to produce a cylindrically configured cutting surface comprising contiguous portions of the base plate and carbide tip.
FIG. 7 provides a top plan view of the FIG. 6 assembly.
FIG. 8 schematically illustrates the manner in which the relatively brittle corner of the carbide cutting tip is exposed to severe stresses during kerf-cutting action but nevertheless effectively resists corner fracturing tendencies so as to provide significantly prolonged operating life.

FIGS. 1 and 2 illustrate several assembled links of a cutter chain, including a right and left-handed cutter link fabricated in accordance with the present invention.

As shown in FIG. 1, the link assembly 1 includes spacer links 2, side links 3, a right-hand cutter link 4, and a left-hand cutter link 5. These links are conventionally interconnected by pivot pins or rivets substantially in the manner described in the aforesaid Bullard, Mills and Mall patents. Thus, as shown in FIG. 2, each spacer link 2, at one end, is sandwiched between and pivotably connected to a pair of side links 3, by a pivot pin or rivet 6 at one end. At the opposite end, the spacer link 2 is sandwiched between and pivotably connected with a cutter link and a side link 3 by another pivot pin or rivet 7.

As will be understood, cutter links 4 and 5 include cutting elements operable to cut on opposite sides of the kerf being formed by the sawing action of the assembly 1.

In describing the cutting links, reference in detail will be made to cutter link 5. It will be understood that link 4 is substantially the same as link 5 and bears a mirror image relationship to link 5.

DETAILS OF CUTTER LINK

FIGS. 3 and 4 illustrate components employed in the fabrication of cutter link 5.

Link 5 includes a planar base plate 8. Plate 8 includes apertures 9 and 10 which enable the link to be pivotably connected to adjoining elements in the assembly 1. Plate 8 is provided with planar, flat sides 11 and 12 as shown, for example, in FIG. 7.

As shown in FIGS. 3 and 6, each of the cutter link base plate apertures 9 and 10 may be chamfered. Thus, aperture 8 is provided with a chamfered rim 9a while aperture 10 is provided with a chamfer 10a, with each of these chamfers being of the type shown in the aforesaid Mall Patent 2,862,533. Rather obviously, such chamfers do not substantially alter the essentially flat, planar character of the side walls 11 and 12 of the cutter link base plate 5 which fully define the base plate sides. That is to say, these side walls extend continuously from the kerf-facing edge of the base plate, downwardly through and beyond the apertured base plate portion.

A planar, flat, plate-like continuation of plate 8 provides a shoulder 13. Shoulder 13 faces generally in the direction of cutting travel D, schematically represented in FIGS. 1, 2, and 3. Shoulder 13 projects generally upwardly, when the plate 8 is viewed as shown in FIG. 3, from a ledge 14. Ledge 14 extends generally in travel direction D although it is slightly inclined relative to this direction. Ledge 14 and shoulder 13 intersect at a junction 15.

Plate 8 also provides a conventional depth gage 16 described, for example, in a United States Ryde Pat. 2,730,143. A concave, surface 16a extends between depth gage 16 and the ledge 14. This surface provides a chip-receiving zone displaced ahead of shoulder 14 and unobstructed by any portion of plate 8.

A cutting tip or block 17 formed of tungsten carbide or other carbide material, or material possessing the wear resistant and cutting qualities of carbide, is mounted on the ledge 14 and shoulder 13 by conventional fastening techniques such as brazing.

Block 17 as shown in FIG. 3, prior to grinding, includes a kerf-base-cutting (i.e. base facing), planar, top surface 18 and a lead face 19. Face 19, prior to grinding, may be planar in form and faces generally in the direction of cutting travel D. Face 19 is inclined transversely of the median plane of the plate 8 and also inclined so as to extend forwardly and upwardly in the direction of travel D.

A kerf-side-cutting (i.e. side facing) face 20 extends longitudinally of the block 17 and transversely of the surfaces 18 and 19. A curved or arcuate edge 21, extending longitudinally of the block 17, interconnects and merges tangentially with the surfaces 18 and 20.

Block 17 additionally includes a stabilizing recess 22. Recess 22 includes a pair of laterally spaced, stabilizing surfaces 23 and 24 which converge gradually in the direction of cutting travel. Each of these surfaces extends generally longitudinally of the shoulder 13 and the base plate 8. An abutment surface 25 extends transversely of and interconnects the surfaces 23 and 24. Surface 25 extends generally vertically of the plate 8 when this plate is viewed as shown in FIG. 3.

Block 17 includes undersurfaces 26 and 27. Surfaces 26 and 27, which extend transversely of the median plane of the plate 8 and connected by a surface 28 which extends parallel to a side 12 of the plate 8. A portion 27a of the surface 27, adjacent the plate side engaging surface 28 provides mounting surface means engageable with the ledge 14 of the plate 8.

As shown in FIGS. 4 and 5, surface 20 generally merges with the plate surface 12 in a direction extending rearwardly of the direction of cutting travel D. In a direction extending vertically downward when the link is viewed as shown in FIG. 3, the surfaces 20 and 12 also merge. A longitudinally extending and planar chamfer 29 serves to interconnect the surfaces 20 and 26.

Block 17 is assembled with the plate 8 as shown in FIGS. 6 and 7. When these elements are so assembled, the shoulder 13 is wedgingly received between the side walls 23 and 24 of the recess 22. The mounting surface 27a is supported on the plate ledge 14. The block 13 may be positively secured into this assembled position by brazing.

With the block and plate thus integrated, a rotary grinding tool may be employed to provide a concavely curved cutting face. The axis of cylindrical curvature of the cutting face may be positioned approximately in alignment with the ledge 14 along the direction of cutting travel D. This axis extends generally transversely of the travel direction D and is inclined rearwardly away from the kerf-side-cutting face 20 with reference to the cutting travel direction D. This axis may lie in a plane extending perpendicular to the median plane of the plate 8.

With the grinding completed, a concave carbide cutting surface 30 will be produced, curving cylindrically about the previously discussed axis. During this grinding process, a lead portion 14a of the ledge 14 may also have been ground so as to define a laterally adjacent continuation of a concave surface portion 30a lying between the block surfaces 28 and 20.

As will also be recognized, above the concave cutting surface portion 30a, the laterally contiguous cutting surface portions 30b and 30c, in essence, provide concave cutting surface projections extending laterally of the plate sides 12 and 11, respectively. Surface portion 30b is vertically contiguous with plate side 12 while surface 30c is vertically contiguous with plate side 11.

At this point, it should be noted that the undersurfaces 26 and 27 are vertically displaced with reference to the median plane of the plate 8. This vertical displacement insures that the undersurface 27 is spaced sufficiently from the side link corner 3a so as to allow th side link 3 to freely pivot beneath the cantilever-like block portion 31.

It should also be noted that the kerf-base-forming surface 18 may be spaced, as shown in FIG. 6, vertically above the top 13a of the shoulder 13, thereby being spaced vertically above the uppermost portion of the plate 8, viewing the plate 8 as shown in FIG. 3.

Concave surface 30 intersects kerf-base-forming surface 18 and kerf-side-forming surface 20 and the arcuate-edge surface 21 so as to form a concave, chisel-like cutting corner 30d having an arcuate cutting edge 30e substantially as shown in FIG. 8. This corner 30d is displaced laterally outwardly of the plate 8.

CUTTING ACTION

FIG. 8 schematically illustrates the cutting position of the block 17 in relation to a kerf portion 32. The kerf-side cutting surface 20 is inclined slightly away from the kerf side so as to minimize tendencies for the cutter links to become stuck or bind within the kerf.

While the term "kerf-side-cutting" has been applied to the surface 20, it will be recognized that the principal side cutting action occurs along the junction of the surfaces 21, 20 and 30. The term "kerf-side-facing" and "kerf-side-cutting" are thus used as synonyms.

Similarly, while the term "kerf-base-cutting surface" has been applied to the block surface 18, base cutting occurs primarily at the junction of the surfaces 30, 21 and 18. Thus "kerf-side-facing" and "kerf-side-cutting" may be viewed as identical terms.

The concave, carbide, cutting extremity 30d, which is disposed laterally outwardly of the base plate 8, is subjected to intensive force while kerf is being formed. The forces acting on the surface 30 might be expected to break the fragile tip 30d. Quite likely it was in anticipation of such breakage tendencies that the prior art, evidenced by Mills, Mall and Bullard teachings, avoided the utilization of concave cutting surfaces, their efficient cutting action notwithstanding.

Nevertheless, it has been found that the concave cutting surface 30, including the tip 30d, is unexpectedly resistant to breakage tendencies and will in fact enjoy a sustained operating life.

It is also somewhat unexpected to find that the block 17 remains stably mounted on the plate 8 in spite of the rigors encountered during cutting. Tendencies toward lateral displacement are resisted by the recess 23 and the side face 28. The side face 20, which extends both forwardly and rearwardly of shoulder 13, tends to laterally shield these stabilizing elements.

Longitudinal displacement is effectively resisted by the shoulder 13. With the axis of curvature of the surface 30 more or less aligned with the ledge 14, the surface 30 is substantially perpendicular to the ledge 14 in the junction zone 33. This tends to provide force vectors, derived from cutting forces acting on this junction, which tend to act longitudinally of the block 30, thereby tending to press it tighter into stabilizing engagement with the shoulder 13. These vectors also tend to counteract or offset forces acting on the tip portion 30d which tend to separate the block 17 from the plate 8.

The rounded edge 21 tends to stabilize cutting action and avoid the undesirable forming of stringy corners. In practice, it has been found that a satisfactory radius for the surface 21 may be on the order of .030 to .040 inch.

It will also be recognized that the longitudinal alignment of the cutting surface 30 and shoulder 13 tends to impose compressive forces on the block 17 during cutting. It is believed that this tendency to compress the block 17 in response to cutting action promotes efficient cutting action on the part of the block 17 and extends the operating life of the block.

It is quite unexpected, however, to find that adequate compression may be produced by a locally acting back-up shoulder 13 which supports a limited, median portion only of the block 17.

The smooth, concave surface comprising surface portions 30 and 14a provides an effective and continuously curved, chip-removal surface extending clear across the link 5.

OPTIMUM STABILITY FOR SUPPORT OF CARBIDE TIP

Figure 9:
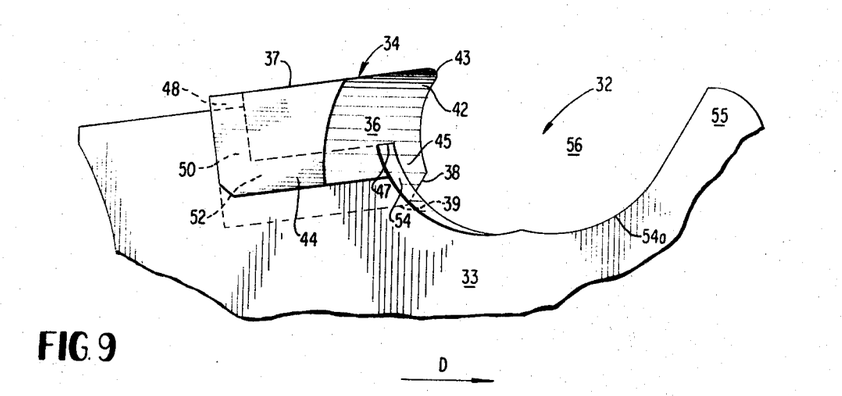
FIGS. 9, 10 and 11 provide side elevations, top plan, and leading edge views, respectively, of a modified form of the carbide tip mounted with improved stability on the cutter link base plate shown in FIG. 3.
Figure 10:
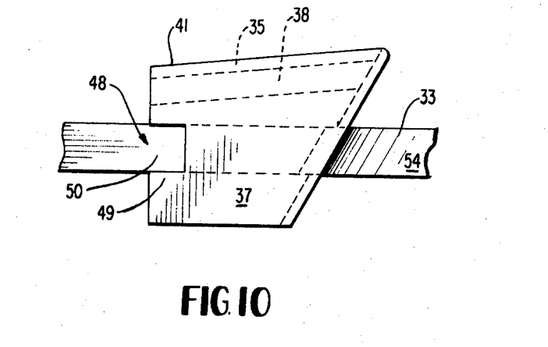
Figure 11:
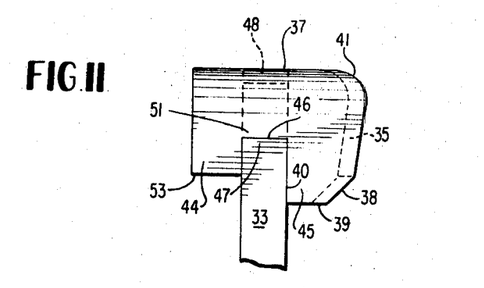

FIGS. 9, 10 and 11 illustrate a modified form 32 of the cutter link which has been provided with an improved, multidirectionally oriented, compounded, stabilizing structure.

As illustrated in FIGS. 9 through 11, base plate 33 is identical to base plate 8 previously described. However, a modified carbide tip 34 includes a uniquely effective stabilizing structure.

Carbide tip 34 includes a side surface 35 identical to side surface 20, a cutting face 36 substantially identical to cutting face 30, a top face 37 identical to face 18, a chamfer shoulder 38 identical to surface 29 and surfaces 39 and 40 identical to surfaces 26 and 28, respectively. An arcuate, i.e., partially cylindrical, block edge 41 tangentially merges with and connects faces 35 and 37. The interaction of faces 35, 36, 37 and 41 yield a chisel-like concave cutting corner 42 having a curved periphery 43. However, cantilever portion 31 has been modified to provide improved, cutter tip, stabilization.

In cutter tip 34 the under surface of the block, viewing the block as shown in the drawings, includes a pair of spaced, parallel and longitudinally extending base portions 44 and 45 extending longitudinally along the supporting surface 46. Supporting surface 46 is substantially coextensive and contiguous with the generally rectangular mounting surface 47 of base plate 33. Surface 47 is identical to ledge 14 of base plate 5.

As thus will be appreciated, the transversely extending stabilizing slot 48 formed in the rear of the carbide cutting tip 34, and corresponding to slot 22, provides a first U-shaped stabilizing structure 49, extending generally longitudinally and rearwardly of the cutting direction D. This stabilizing portion embraces opposite sides of the back-up shoulder 50 of plate 33 (identical to shoulder 13) and may be bonded to these parallel, flat side portions of the base plate by brazing.

Similarly, extending ridges 44 and 45 define a second, U-shaped stabilizing portion facing transversely of the cutting direction D and away from the kerf-base facing edge of the cutter link 32. This second U-shaped stabilizing carbide tip portion 51 conformingly embraces opposite flat, parallel sides of the mounting surface 47 of base plate 33.

Thus the two, U-shaped, stabilizing structures 49 and 51 are oriented in a generally mutually perpendicular relationship and are mutually displaced both longitudinally and transversely of the cutting direction. This overall orientation provides a uniquely effective stability in respect to the mounting of the tip 34 on the base plate 33. As will be noted, stabilizing portions 49 and 51 cooperate to provide an L-shaped stabilizing slot 52 having parallel, L-shaped side walls and receiving, in brazed relationship, the ledge 47 and shoulder 50.

As will be appreciated, surface 53 of ridge 44 is spaced from surface 54 of ridge 45 so as to allow for the pivoting action of link extremity 3a, assuming that link 32 is incorporated in assembly 1 in place of link 5.

As will be further appreciated, cutting surface 36 may be ground on block 34 while block 34 is positioned on mounting plate 33. When such in-place grinding takes place, there may desirably be produced a concave plate surface 54 extending downwardly from ledge 47 and in coplanar relationship with the curved cylindrical surface of cutting face 36.

Kerf-side facing surface 35 converges with the median longitudinal plane of base plate 33, rearwardly of the cutting direction D. Surface 35 also converges with this median plane in a direction extending transversely of the cutting direction D and generally away from the kerf-base facing surface 37. This dual inclination avoids "sticky" cutting action.

As will also be appreciated, the width of the slot 52, as well as the width of the plate 33, is less than the width of the carbide tip portion projecting laterally on either side of the base plate 33. It thus is significant to note that with only up to a third of the width of the carbide tip backed up by the base plate shoulder 50, effective tip support and carbide material compression will be produced. Slot 52 and plate 33 are both generally aligned with the median, longitudinally extending plane of block 34.

Plate surface 54, and its continuation 54a extending to a depth gage 55, provides a concave, chip-receiving zone unobstructed by any plate portion. Thus, cuttings or chips removed by the cutting face 36 may curl into the concave chip-receiving zone 56. Compressive forces resulting from the cutting action thus may act fully on the cutting face 36 without any impedance on the part of any portion of the base plate 33.

SUMMARY OF ADVANTAGES AND SCOPE OF INVENTION

A prime advantage of the invention resides in the provision of a carbide tip for a cutting link, including the especially effective concave cutting surface.

Another prime advantage of the cutter link of the present invention entails the cutting action provided by the rounded edge 21. This edge, which effectively avoids "stringy" cutting action, contributes significantly to improved cutting action.

The stabilizing recess 22 uniquely but simply supports the block 17 so as to offset lateral instability.

The wedging cooperation between the recess 22 and the shoulder 13 tends to intensify or improve this stabilizing action.

Unitized concave curvature of the plate portion 14a and the block surface 30 yields a smooth chip-removing surface continuously and uniformly effective across the cutter link width.

The general alignment of the axis of curvature of the cutting surface with the plate ledge tends to yield some vectors acting on the block so as to promote block stability, or at least minimize the extent of the adversely directed vectors.

It should also be recognized that basically improved and simplified cutter tip mounting results from the combination of a pair of longitudinally and transversely extending, U-shaped, carbide tip, stabilizing portions. One of these portions extends longitudinally of the cutting direction and stabilizes an outward portion of the cutting tip by embracing opposite sides of a back-up shoulder formed on the cutter link base plate. The other U-shaped portion embraces a mounting ledge and stabilizes an inner portion of the tip. This compound stabilizing action, which is achieved with minimum structural complexity is believed to contribute significantly to cutter link ruggedness and effectiveness. Tendencies of the carbide block to rotate about axes aligned with the cutting direction, and extending transversely of the cutting direction, are resisted.

By having a chip-receiving zone formed in the base plate which is unobstructed by the base plate itself between the carbide tip supporting ledge and the depth gage, assurance is provided that the base plate will not interfere with the compressive interaction between the back-up shoulder and cutting forces exerted on the concave cutting face of the carbide tip.

In describing the invention, reference has been made to a preferred embodiment. However, those skilled in the chain saw art may well recognize additions, deletions, substitutions, or other modifications which would fall within the purview of the invention as defined in the appended claims.

I claim:

1. A cutter link for use in a chain saw, said cutter link comprising:
   a substantially, planar base plate having generally parallel, flat sides;
   aperture means formed in said base plate;
   shoulder means substantially coextensive with, and formed on, said base plate and facing in the direction of cutting travel of said plate, said shoulder means defining a substantially flat, planar continuation of said base plate;
   concave, carbide, cutting surface means extending transversely of said base plate and projecting laterally beyond each side thereof, with the portions of said concave surface means which project beyond each side of said base plate being contiguous with said base plate;

said concave, carbide cutting surface means being located forwardly of said shoulder means, in said direction of cutting travel, with a portion of said concave cutting surface means being aligned with said shoulder means in said direction;
kerf-base-cutting, surface means extending transversely of said base plate;
kerf-side-cutting, surface means extending generally longitudinally of said base plate;
said concave, carbide cutting surface means and said kerf-base and kerf-side-cutting, surface means intersecting laterally outwardly of one side of said base plate to define a concave, chisel-like, corner facing generally in said cutting travel direction;
first, stabilizing, surface means connected with said concave, carbide cutting surface means and extending longitudinally of said base plate along one side of said shoulder means;
second, stabilizing, surface means connected with said concave, carbide cutting surface means and extending longitudinally of said base plate along a side of said shoulder means opposite to said one side;
said first and second stabilizing surface means cooperating to define a stabilizing recess means within which said shoulder means is received;
supplemental stabilizing surface means, connected with said concave carbide cutting surface means, and embracing at least one side of said base plate, said supplemental stabilizing surface means, at least in part, being displaced both in said cutting travel direction and transversely thereof from said stabilizing recess means and extending generally transversely of said cutting travel direction and transversely of said kerf-base-cutting surface means;
said concave, carbide cutting surface means extending away from said kerf-side-cutting surface means, generally transversely and rearwardly of said cutting travel direction; and
said portion of said concave, carbide cutting surface means located forwardly of said shoulder means, being operable to be interposed, along said cutting travel direction, between said shoulder means and an uncut kerf portion and operable to transmit cutting force generally along said cutting travel direction toward said shoulder means.

2. A cutter link for use in a chain saw, said cutter link comprising:
a substantially, planar base plate having generally parallel, flat sides;
aperture means formed in said base plate;
shoulder means substantially coextensive with, and formed on, said base plate and facing in the direction of cutting travel of said plate, said shoulder means defining a substantially flat planar continuation of said base plate;
concave, carbide, cutting surface means extending transversely of said base plate and projecting laterally beyond each side thereof, with the portions of said concave surface means which project beyond each side of said base plate being contiguous with said base plate;
said concave, carbide cutting surface means being located forwardly of said shoulder means, in said direction of cutting travel, with a portion of said concave cutting surface means being aligned with said shoulder means in said direction;
kerf-base-cutting, carbide surface means extending transversely of said base plate;
kerf-side-cutting, carbide surface means extending generally longitudinally of said base plate and extending both forwardly and rearwardly of said shoulder means in said direction of cutting travel of said plate;
said concave, carbide cutting surface means and said kerf-base and kerf-side-cutting, carbide surface means intersecting laterally outwardly of one side of said base plate to define a concave, chisel-like, corner facing generally in said cutting travel direction;
first, stabilizing, carbide surface means connected with said concave, carbide cutting surface means and extending longitudinally of said base plate along one side of said shoulder means; second, stabilizing, carbide surface means connected with said concave, carbide cutting surface means and extending longitudinally of said base plate along a side of said shoulder means opposite to said one side;
carbide abutment means extending transversely of and interconnecting said first and second carbide stabilizing surface means, facing said shoulder means and interposed between said shoulder means and said concave cutting surface means along said cutting travel direction;
said first and second stabilizing, carbide surface means cooperating to define a stabilizing recess means within which said shoulder means is received;
supplemental stabilizing surface means, connected with said concave carbide cutting surface means, and embracing at least one side of said base plate, said supplemental stabilizing surface means, at least in part, being displaced both in said cutting travel direction and transversely thereof from said stabilizing recess means and extending generally transversely of said cutting travel direction and transversely of said kerf-base-cutting surface means;
said concave, carbide cutting surface means extending away from said kerf-side-cutting surface means, generally transversely and rearwardly of said cutting travel direction; and
said portion of said concave, carbide cutting surface means located forwardly of said shoulder means being operable to be interposed, along said cutting travel direction, between said shoulder means and an uncut kerf portion and operable to transmit cutting force generally along said cutting travel direction toward said shoulder means.

3. A cutter link as described in claim 2:
wherein said first and second stabilizing surface means diverge longitudinally away from said carbide, cutting surface means and toward said shoulder means.

4. A cutter link as described in claim 2:
wherein said concave carbide cutting surface means is cylindrically curved about an axis extending transversely of said cutting travel direction;
wherein said base plate includes a ledge extending generally in said cutting travel direction and forming a junction with said shoulder means; and
wherein said axis is substantially aligned, in said cutting travel direction, with said ledge and junction.

5. A cutter link for use in a chain saw, said cutter link comprising:
a substantially, planar base plate having generally parallel, flat sides;
aperture means formed in said base plate;
shoulder means substantially coextensive with, and formed on, said base plate and facing in the direction of cutting travel of said plate, said shoulder means defining a substantially flat, planar continuation of said base plate;
a carbide cutting tip, said tip including
concave, carbide, cutting surface means extending transversely of said base plate and projecting laterally beyond each side thereof, with the portions of said concave surface means which project beyond each side of said base plate being contiguous with said base plate,
said concave, carbide cutting surface means being located forwardly of said shoulder means, in said direction of cutting travel, with a portion of said concave cutting surface means being aligned with said shoulder means in said direction, kerf-base-cutting, carbide surface means extending transversely of said base plate, kerf-side-cutting, carbide surface means extending generally longitudinally of said base plate and extending both forwardly and rearwardly of said shoulder means in said direction of cutting travel of said plate, said concave, carbide cutting surface means and said kerf-base and kerf-side-cutting, carbide surface means intersecting laterally outwardly of one side of said base plate to define a concave, chisel-like corner facing generally in said cutting travel direction, first, stabilizing, carbide surface means connected with said concave, carbide cutting surface means and extending longitudinally of said base plate along one side of said shoulder means, second, stabilizing, carbide surface means connected with said concave, carbide cutting surface means and extending longitudinally of said base plate along a side of said shoulder means opposite to said one side, and carbide abutment means extending transversely of and interconnecting said first and second carbide stabilizing surface means and facing said shoulder means, and interposed between said shoulder means and concave cutting surface means along said cutting travel direction;

said first and second stabilizing surface means diverging longitudinally away from said carbide, cutting surface means and toward said shoulder means;

said concave, carbide, cutting surface means being cylindrically curved about an axis extending transversely of said cutting travel direction and inclined relative thereto;

said base plate including a cylindrically curved portion located forwardly of said shoulder means in said cutting travel direction;

said concave, carbide, cutting surface means including a portion disposed laterally of said cylindrically curved portion of said base plate and defining a contiguous lateral continuation thereof on one side of said base plate;

said cutter link further including first and second, carbide, undersurface means extending longitudinally of said concave carbide cutting surface means, extending rearwardly thereof in said cutting travel direction, extending transversely of said base plate, and projecting laterally of and contiguous with the sides of said base plate, said first and second carbide undersurface means being mutually displaced in a direction measured parallel to said base plate and transversely of said cutting travel direction;

said base plate including a ledge extending generally in said cutting travel direction and forming a junction with said shoulder means; and said axis of said concave cutting surface means being substantially aligned, in said cutting travel direction, with said ledge means and junction.

6. A carbide cutting tip for use in a chain saw, said tip comprising:

concave, carbide cutting surface means;

carbide mounting surface means extending transversely of said concave cutting surface means and operable to support said tip on a cutter link of a chain saw;

stabilizing, carbide recess means extending transversely of and intersecting said mounting surface means and displaced from said cutting surface means;

kerf-side-cutting, carbide surface means extending, generally transversely of said concave cutting surface means, generally longitudinally of said mounting surface means, and generally longitudinally of, but spaced outwardly from, said stabilizing recess means;

kerf-base-cutting, carbide surface means extending transversely of and intersecting said concave cutting surface means and said kerf-side-cutting, surface means;

the intersection of said concave cutting surface means and said kerf-side-cutting and kerf-base-cutting surface means forming a chisel-like, concave corner;

supplemental stabilizing surface means, connected with said concave carbide cutting surface means, and operable to embrace at least one side of said cutter link, said supplemental stabilizing surface means, at least in part, being adapted to be mounted on said link so as to be displaced both in a cutting travel direction and transversely thereof from said recess means and extend generally transversely of said cutting travel direction and transversely of said kerf-base-cutting, carbide surface means;

said concave, carbide cutting surface means being adapted to extend away from said kerf-side-cutting, carbide surface means, generally transversely and rearwardly of said cutting travel direction; and said portion of said concave, carbide cutting surface means being operable to be interposed, along said cutting travel direction, between a shoulder means carried by said link and an uncut kerf portion and operable to transmit cutting force generally along said cutting travel direction toward said shoulder means.

7. A cutting tip for use in a chain saw, said tip comprising:

concave, cutting surface means;

mounting surface means extending transversely of said concave cutting surface means and operable to support said tip on a cutter link of a chain saw;

stabilizing, recess means extending transversely of and intersecting said mounting surface means and displaced from said cutting surface means;

kerf-side-cutting, surface means extending, generally transversely of said concave cutting surface means and generally longitudinally of said mounting surface means, and generally longitudinally of, but spaced outwardly from, said stabilizing recess means;

kerf-base-cutting, surface means extending transversely of and intersecting said concave cutting surface means and said kerf-side-cutting, surface means;

the intersection of said concave cutting surface means and said kerf-side-cutting and kerf-base-cutting surface means forming a chisel-like, concave corner;

supplemental stabilizing surface means, connected with said concave cutting surface means, and operable to embrace at least one side of said cutter link, said supplemental stabilizing surface means, at least in part, being adapted to be mounted on said link so as to be displaced both in a cutting travel direction and transversely thereof from said recess means and extend generally transversely of said cutting travel direction and transversely of said kerf-base-cutting, surface means;

said concave, cutting surface means being adapted to extend away from said kerf-side-cutting, surface means, generally transversely and rearwardly of said cutting travel direction; and said portion of said concave, cutting surface means being operable to be interposed, along said cutting travel direction, between a shoulder means carried by said link and an uncut kerf portion and operable to transmit cutting force generally along said cutting travel direction toward said shoulder means.

8. A cutting tip for use in a chain saw, said tip comprising:

concave, cutting surface means;

mounting surface means extending transversely of said concave cutting surface means and operable to support said tip on a cutter link of a chain saw;

stabilizing, recess means extending transversely of and intersecting said mounting surface means and displaced from said cutting surface means;

kerf-side-cutting, surface means extending, generally transversely of said concave cutting surface means and generally longitudinally of said mounting surface means, and generally longitudinally of, but spaced outwardly from, said stabilizing recess means;

kerf-base-cutting, surface means extending transversely of and intersecting said concave cutting surface means;

arcuate kerf-corner-cutting, edge means extending longitudinally of and connecting said kerf-side-cutting and kerf-base-cutting surface means;

the intersection of said concave cutting surface means and said arcuate edge means forming a chisel-like, concave corner having a rounded periphery;

supplemental stabilizing surface means, connected with said concave cutting surface means, and operable to embrace at least one side of said cutter link, said supplemental stabilizing surface means, at least in part, being adapted to be mounted on said link so as to be displaced both in a cutting travel direction and transversely thereof from said recess means and extend generally transversely of said cutting travel direction and transversely of said kerf-base-cutting, surface means;

said concave, cutting surface means being adapted to extend away from said kerf-side-cutting, surface means, generally transversely and rearwardly of said cutting travel direction; and said portion of said concave, cutting surface means being operable to be interposed, along said cutting travel direction, between a shoulder means carried by said link and an uncut kerf portion and operable to transmit cutting force generally along said cutting travel direction toward said shoulder means.

9. A cutter link for use in a chain saw, said cutter link comprising:

a substantially planar base plate having generally parallel, flat wall portions;

a depth gage formed as an integral portion of one end of said base plate;

a cutting tip, supporting ledge spaced longitudinally from said depth gage in the cutting direction of said cutter link and extending generally longitudinally of said cutting direction;

wall means of said base plate defining a concave, chip-receiving zone between and intersecting said depth gage and said supporting ledge and unobstructed by the remainder of said base plate;

a cutting tip stabilizing shoulder extending transversely of said supporting ledge and away from said supporting ledge, generally toward a kerf-base-facing edge of said cutter link;

a cutting tip supported on said supporting ledge;

a U-shaped, cutting tip portion facing generally longitudinally and rearwardly of said cutting direction and extending along each of the flat wall portions of said base plate adjacent said stabilizing shoulder;

concave, cutting surface means carried by said cutting tip;

said U-shaped cutting tip portion defining a stabilizing recess within which said stabilizing shoulder is received;

supplemental stabilizing surface means, connected with said concave cutting surface means, and embracing at least one side of said base plate, said supplemental stabilizing surface means, at least in part, being displaced both in said cutting direction and transversely thereof from said stabilizing slot and extending generally transversely of said cutting direction and transversely of and away from said supporting ledge;

said concave, cutting surface means extending away from a kerf-side-facing portion of said tip, generally transversely and rearwardly of said cutting direction; and at least a portion of said concave, carbide cutting surface means being operable to be interposed, along said cutting direction, between said stabilizing shoulder and an uncut kerf portion and operable to transmit cutting force generally along said cutting travel direction toward said shoulder.

10. A cutter link for use in a chain saw, said cutter link comprising:

a substantially planar base plate having generally parallel, flat walls fully defining the sides thereof;

a depth gage formed as an integral portion of one end of said base plate;

a cutting tip, supporting ledge spaced longitudinally from said depth gage in the cutting direction of said cutter link and extending generally longitudinally of said cutting direction;

wall means of said base plate defining a concave, chip-receiving zone between and intersecting said depth gage and said supporting ledge and unobstructed by the remainder of said base plate;

a cutting tip stabilizing shoulder extending transversely of said supporting ledge and away from said supporting ledge, generally toward a kerf-facing edge of said cutter link;

a cutting tip supported on said supporting ledge;

a first, U-shaped, cutting tip portion facing generally longitudinally and rearwardly of said cutting direction and extending along each of the flat walls of said base plate adjacent said stabilizing shoulder;

a second, U-shaped, cutting tip portion facing generally transversely of said first U-shaped tip portion and extending generally away from said cutting edge of said cutter link and along each of said parallel flat walls of said base plate, adjacent said supporting ledge;

a concave cutting face carried by said cutting tip and facing generally in said cutting direction;

a kerf-base-facing surface carried by said cutting tip;

a kerf-side-facing surface carried by said cutting tip; and an arcuate surface merging generally tangentially with and interconnecting each of said kerf-side and kerf-base facing surfaces;

said kerf-base-facing surface, said kerf-side-facing surface, said concave cutting surface and said arcuate surface intersecting to define a generally concave kerf corner cutting tip having a rounded, chisel-like periphery.

11. A cutter link for use in a chain saw, said cutter link comprising:

a substantially planar base plate having generally parallel, flat walls fully defining the sides thereof;

a depth gage formed as an integral portion of one end of said base plate;

a cutting tip, supporting ledge spaced longitudinally from said depth gage in the cutting direction of said cutter link and extending generally longitudinally of said cutting direction;

wall means of said base plate defining a concave, chip-receiving zone between and intersecting said depth gage and said supporting ledge and unobstructed by the remainder of said base plate;

a cutting tip stabilizing shoulder extending transversely of said supporting ledge and away from said supporting ledge, generally toward a kerf-facing edge of said cutter link;

a carbide cutting tip supported on said supporting ledge;

a first, U-shaped, cutting tip portion facing generally longitudinally and rearwardly of said cutting direction and extending along each of the flat walls of said base plate adjacent said stabilizing shoulder;

a second, U-shaped, cutting tip portion facing generally transversely of said first U-shaped tip portion and extending generally away from said cutting edge of said cutter link and along each of said parallel flat walls of said base plate, adjacent said supporting ledge;

a concave cutting face carried by said cutting tip and facing generally in said cutting direction;

a kerf-base-facing surface carried by said cutting tip;

an arcuate surface merging generally tangentially with and interconnecting each of said kerf-side and kerf-base-facing surfaces;

said kerf-base-facing surface, said kerf-side-facing surface, said concave cutting surface and said arcuate surface intersecting to define a generally concave kerf corner cutting tip having a rounded, chisel-like periphery;

said kerf-side-facing surface converging with a longitudinally extending, median plane of said base plate in a direction extending rearwardly of said cutting direction;

said kerf-side-facing surface additionally converging with said median plane in a direction extending transversely of said cutting direction and generally away from said kerf-base-facing surface; and said flat, parallel walls of said planar base plate being spaced a distance not exceeding about a third of the width of said cutting tip, with said first and second U-shaped cutting tip portions cooperating to define a generally L-shaped slot disposed generally in alignment with a longitudinal median plane of said cutting tip and receiving, in brazed relationship, said supporting ledge and said stabilizing shoulder.

12. A cutter link for use in a chain saw, said cutter link comprising:

a substantially, planar base plate having generally parallel, flat sides;

aperture means formed in said base plate;

shoulder means substantially coextensive with, and formed on, said base plate and facing in the direction of cutting travel of said plate, said shoulder means defining a substantially flat, planar continuation of said base plate;

concave, carbide, cutting surface means extending transversely of said base plate and projecting laterally beyond each side thereof, with the portions of said concave surface means which project beyond each side of said base plate being contiguous with said base plate;

said concave, carbide cutting surface means being located forwardly of said shoulder means, in said direction of cutting travel, with a portion of said concave cutting surface means being aligned with said shoulder means in said direction;

kerf-base-cutting, carbide surface means extending transversely of said base plate;

kerf-side-cutting, carbide surface means extending generally longitudinally of said base plate and extending both forwardly and rearwardly of said shoulder means in said direction of cutting travel of said plate;

said concave, carbide cutting surface means and said kerf-base and kerf-side-cutting, carbide surface means intersecting laterally outwardly of one side of said base plate to define a concave, chisel-like, corner facing generally in said cutting travel direction;

first, stabilizing, carbide surface means connected with said concave, carbide cutting surface means and extending longitudinally of said base plate along one side of said shoulder means;

second, stabilizing, carbide surface means connected with said concave, carbide cutting surface means and extending longitudinally of said base plate along a side of said shoulder means opposite to said one side; and carbide abutment means extending transversely of and interconnecting said first and second carbide stabilizing surface means, facing said shoulder means and interposed between said shoulder means and said concave cutting surface means along said cutting travel direction;

said concave, carbide, cutting surface means being cylindrically curved about an axis extending transversely of said cutting travel direction and inclined relative thereto;

said base plate including a cylindrically curved portion located forwardly of said shoulder means in said cutting travel direction;

said concave, carbide, cutting surface means including a portion disposed laterally of said cylindrically curved portion of said base plate and defining a contiguous lateral continuation thereof on one side of said base plate; and said cutter link further including first and second, carbide, undersurface means extending longitudinally of said concave carbide cutting surface means, extending rearwardly thereof in said cutting travel direction, extending transversely of said base plate, and projecting laterally of and contiguous with the sides of said base plate, said first and second carbide undersurface means being mutually displaced in a direction measured parallel to said base plate and transversely of said cutting travel direction.

References Cited

UNITED STATES PATENTS

| 279,781 | 6/1883 | Magaw | 143—135 |
| 2,664,120 | 12/1953 | Hinkley | 143—135 |
| 2,744,548 | 5/1956 | Stephenson et al. | |
| 2,976,900 | 3/1961 | Mills | 143—135 |
| 2,994,350 | 8/1961 | Lundberg | 143—135 X |
| 3,036,606 | 5/1962 | Richardson. | |

FOREIGN PATENTS 937,716   9/1963   Great Britain.

DONALD R. SCHRAN, Primary Examiner

PO-1050
(5/69)

UNITED STATES PATENT OFFICE
CERTIFICATE OF CORRECTION

Patent No. 3,519,039                Dated July 7, 1970

Inventor(s) JACK W. EHLEN

It is certified that error appears in the above-identified patent and that said Letters Patent are hereby corrected as shown below:

In column 4, line 30, following "aperture" delete "8" and insert -- 9 -- .
In column 4, line 48, following "tion" delete "15".
In column 5, line 41, following "portion" delete "14a".
In column 5, line 56, following "allow" change "th" to -- the -- .
In column 12, line 18, before "portion" delete "said" and insert -- a -- .
In column 12, line 60, before "portion" delete "said" and insert -- a -- .
In column 13, line 28, before "portion" delete "said" and insert -- a -- .
In column 15, between lines 5 and 6, insert the following paragraph:

-- A kerf side facing surface carried by said cutting tip;--

SIGNED AND
SEALED
NOV. 17 1970

NOV. 17, 1970

(SEAL)
Attest:

Edward M. Fletcher, Jr.
Attesting Officer

WILLIAM E. SCHUYLER, JR.
Commissioner of Patents